(12) United States Patent
Zhu et al.

(10) Patent No.: US 8,755,416 B2
(45) Date of Patent: Jun. 17, 2014

(54) SOLID STATE THIN DISK LASER

(71) Applicant: Huazhong University of Science and Technology, Wuhan (CN)

(72) Inventors: Xiao Zhu, Wuhan (CN); Guangzhi Zhu, Wuhan (CN); Changhong Zhu, Wuhan (CN); Lijun Qi, Wuhan (CN); Jianli Shang, Wuhan (CN); Xingyun Duan, Wuhan (CN); Peng Chen, Wuhan (CN)

(73) Assignee: Huazhong University of Science and Technology, Wuhan (CN)

( * ) Notice: Subject to any disclaimer, the term of this patent is extended or adjusted under 35 U.S.C. 154(b) by 0 days.

(21) Appl. No.: 13/655,478

(22) Filed: Oct. 19, 2012

(65) Prior Publication Data

US 2013/0039378 A1    Feb. 14, 2013

Related U.S. Application Data

(63) Continuation-in-part of application No. PCT/CN2010/071865, filed on Apr. 19, 2010.

(51) Int. Cl.
*H01S 3/30* (2006.01)

(52) U.S. Cl.
USPC ......... 372/7; 372/35; 372/75; 372/99; 372/92

(58) Field of Classification Search
USPC ........................ 372/7, 35, 75, 99, 92
See application file for complete search history.

(56) References Cited

U.S. PATENT DOCUMENTS

| | | | | |
|---|---|---|---|---|
| 6,577,666 B2 * | 6/2003 | Erhard et al. | | 372/70 |
| 6,891,874 B2 * | 5/2005 | Erhard et al. | | 372/64 |
| 2006/0209918 A1 * | 9/2006 | Wang et al. | | 372/70 |
| 2011/0157689 A1 * | 6/2011 | Lundquist et al. | | 359/347 |
| 2011/0206077 A1 * | 8/2011 | Schlie et al. | | 372/35 |

* cited by examiner

*Primary Examiner* — Kinam Park
(74) *Attorney, Agent, or Firm* — Matthias Scholl P.C.; Matthias Scholl

(57) ABSTRACT

A laser including a semiconductor laser stack group, a beam compositor, a pump beam collimator, a thin-disk laser crystal, a first and a second parabolic reflectors with the same facial contour function, a corrective reflector, an output mirror, and a jet-flow impact cooling system. The thin-disk laser crystal and the output mirror form a laser resonant cavity. The first parabolic reflector, second parabolic reflector, thin-disk laser crystal, and corrective reflector form a multi-pumping focus cavity. The jet-flow impact cooling system is used for cooling the thin-disk laser crystal. The pump light produced by the semiconductor laser stack group is composited by the beam compositor, collimated by the pump light collimator, and enters the multi-pumping focus cavity. Within the multi-pumping focus cavity, the pump light is focused, collimated, and deflected to converge on the thin-disk laser crystal. The laser resonant cavity produces and outputs a laser beam.

5 Claims, 17 Drawing Sheets

SOLID STATE THIN DISK LASER

CROSS-REFERENCE TO RELATED APPLICATIONS

This application is a continuation-in-part of International Patent Application No. PCT/CN2010/071865 with an international filing date of Apr. 19, 2010, designating the United States, now pending, the contents of which, including any intervening amendments thereto, are incorporated herein by reference.

BACKGROUND OF THE INVENTION

1. Field of the Invention

The invention relates to a laser, and more particularly to a thin-disk solid state laser.

2. Description of the Related Art

With continuous development in laser technology, solid state laser has become a unique branch in the laser family with its incomparable merits. It develops by leaps and bounds to make higher achievement in average power, beam quality, and conversion efficiency. Meanwhile, the inter-penetration between solid state laser technology and other high and new technologies enables the solid state laser to be more widely applied in such fields as shell plate welding on auto body, tailor welding of auto plate, and metal plate cutting. However, traditional rod solid state laser has limitations on the structure of lateral pump and cooling method. These limitations may lead to distribution of radial temperature field within the crystal, bring in such problems as thermal lens effect and double refraction of thermal stress, cause a drop on the quality of output laser beam, and restrict the application of laser in laser processing technical field.

The thin-disk solid state laser mainly makes use of thin-disk laser crystal as the gain medium. Generally, end pump is adopted and the direction of heat flow is parallel to the direction of optical axis. Since laser crystal is thin, the temperature increase within the crystal will not be so dramatic even under extremely high density of pump power. The even temperature distribution within the crystal enables it to produce high-quality laser beam.

Both high-efficient pump and crystal cooling are key technologies in thin-disk solid state laser. At present, most of thin-disk solid state lasers adopt the plan of multi-pumping in single paraboloid beam space, for this plan achieves perfect effect on the power, efficiency, and beam quality of solid state laser. However, this multi-pumping technology also encounters some problems such as the complex mechanical structure and difficult optical adjustment. Main crystal plan refers to the cooling plan with high efficiency, but in this plan, the element processing is really difficult, the assembly space is small and the cooler and pump within the system confronts much higher requirements.

In 2008, a plan about a thin-disk solid state laser with SMD crystal cooling system and multi-pumping structure was proposed, which is based on conjugated double-paraboloid, inclined laser crystal, and corrective reflector. This new plan can realize multi-pumping and disk cooling to some degree, but its main problem is the low efficiency of pump light due to the inclined position of laser crystal. When the laser crystal is placed in an inclined position, only one beam of pump light is permitted to enter the focus cavity and this is unfavorable to gain higher pump efficiency. It is really difficult to adjust the resonant cavity (whose direction is also the output direction of laser) and use the output laser because of the inclined position of laser crystal. Moreover, in this plan, the laser crystal is connected with cooling system through SMD technology. For the immersion jet-flow impact cooling system, its design is difficult, heat transfer efficiency is low, and the assembly is complex.

SUMMARY OF THE INVENTION

In view of the above-described problems, it is one objective of the invention to provide a laser which is able to conduct pumping for multiple times, puts lower requirements towards the pump source, beam composition, collimating and shaping, and cooler, has simple mechanical structure for both manufacturing and assembly, and achieves the laser output with high power, efficiency, and beam quality.

To achieve the above objective, in accordance with one embodiment of the invention, there is provided a laser comprising a semiconductor laser stack group, a beam compositor, a pump beam collimator, a thin-disk laser crystal, a first and second parabolic reflectors with the same facial contour function, a corrective reflector, an output mirror, and a jet-flow impact cooling system. The thin-disk laser crystal and output mirror form a laser resonant cavity. The jet-flow impact cooling system is used for the cooling of the thin-disk laser crystal. The first and second parabolic reflectors with the same facial contour function are placed with the same conjugated axis and one of the reflectors has a vertex on the focus of the other. The thin-disk laser crystal is welded, pasted, or cramped to the vertex of the first parabolic reflector. The thin-disk laser crystal is vertical to an optical axis of the first parabolic reflector. The corrective reflector is fixed on the vertex of the second parabolic reflector. An angle $\alpha$ between the corrective reflector and an optical axis of the second parabolic reflector is 1-5 degrees. A bar entrance of pump light is fixed on the first parabolic reflector. The geometrical center of the bar entrance drifts along the fast axis relative to thin-disk laser crystal. The pump light produced by the semiconductor laser stack group is composited by the beam compositor, collimated by the pump light collimator, and enters a multi-pumping focus cavity through the bar entrance on the first parabolic reflector. The multi-pumping focus cavity is formed by the first parabolic reflector, second parabolic reflector, thin-disk laser crystal, and corrective reflector. Within the multi-pumping focus cavity, the pump light is focused, collimated, and deflected to converge on the thin-disk laser crystal. The laser resonant cavity produces and outputs a laser.

In accordance with another embodiment of the invention, there provided is a laser comprising a semiconductor laser stack group, a beam compositor, a pump beam collimator, a thin-disk laser crystal, a first and second parabolic reflectors with the same facial contour function, a corrective reflector, an output mirror, and a jet-flow impact cooling system. The thin-disk laser crystal, the corrective reflector, and the output mirror, or the thin-disk laser crystal, the output mirror, and a total-reflection mirror form a laser resonant cavity. The jet-flow impact cooling system is used for the cooling of the thin-disk laser crystal. The first and second parabolic reflectors with the same facial contour function are placed with the same conjugated axis and one of the reflectors has a vertex on the focus of the other. The thin-disk laser crystal is welded, pasted, or cramped to the vertex of the second parabolic reflector. The thin-disk laser crystal is vertical to an optical axis of the second parabolic reflector. The corrective reflector is fixed on the vertex of the first parabolic reflector. An angle $\alpha$ between the corrective reflector and an optical axis of the first parabolic reflector is 1-5 degrees. Two bar entrances of pump light are distributed evenly and symmetrically along the slow axis on the first parabolic reflector as well as on the both sides of the thin-disk laser crystal. The pump light produced by the semiconductor laser stack group is composited by the beam compositor, collimated by the pump light collimator, and enters a multi-pumping focus cavity through the two bar entrances on the first parabolic reflector. The multi-pumping focus cavity is formed by the first parabolic reflector, second parabolic reflector, thin-disk laser crystal, and corrective reflector. Within the multi-pumping focus cavity, the pump light is focused, collimated, and deflected to converge on the thin-disk laser crystal. The laser resonant cavity produces and outputs a laser.

In accordance with still another embodiment of the invention, there provided is a laser comprising a semiconductor laser stack group, a beam compositor, a pump beam collimator, a thin-disk laser crystal, a first and a second parabolic reflectors with the same facial contour function, a corrective reflector or an optical element of diffuse reflection, an output minor, and a jet-flow impact cooling system. The thin-disk laser crystal and output mirror form a laser resonant cavity. The jet-flow impact cooling system is used for the cooling of the thin-disk laser crystal. The first and second parabolic reflectors with the same facial contour function are placed with the same conjugated axis and one of the reflectors has a vertex on the focus of the other. The thin-disk laser crystal is welded, pasted, or cramped to the vertex of the first parabolic reflector. A tilt angle β between the thin-disk laser crystal and the optical axis of the first parabolic reflector is 3-8 degrees. The corrective reflector or optical element of diffuse reflection is fixed on the vertex of the second parabolic reflector. A tilt angle α is formed between the corrective reflector and the optical axis of the second parabolic reflector. The direction of the tilt angle α is opposite to the direction of β, and the difference between the two angles is 1-5 degrees, or the optical element of diffuse reflection is vertical to the optical axis of the second parabolic reflector. Two bar entrances of pump light are distributed evenly and symmetrically along the slow axis on the first parabolic reflector as well as on the both sides of thin-disk laser crystal. The pump light produced by the semiconductor laser stack group is composited by the beam compositor, collimated by the pump light collimator, and enters a multi-pumping focus cavity through the two bar entrances on the first parabolic reflector. The multi-pumping focus cavity is formed by the first parabolic reflector, second parabolic reflector, thin-disk laser crystal, and corrective reflector or optical element of diffuse reflection. Within the multi-pumping focus cavity, the pump light is focused, collimated, and deflected to converge on the thin-disk laser crystal. The laser resonant cavity produces and outputs a laser.

In a class of this embodiment, a plurality of thin-disk laser crystals pumped by several multi-pumping focus cavities are concatenated through flat total-reflection or curved total-reflection mirrors to form the laser resonant cavity with the output mirror.

In a class of this embodiment, the corrective reflector has different kinds of coatings which can be high-reflection coating or wavelength-selective coating (high-reflection coating for pump light while high-transparency coating for output laser).

In a class of this embodiment, one side of the thin-disk laser crystal which is away from another parabolic reflector is galvanized with a coating which is highly reflective to the pump light and output laser while the other side is galvanized with a coating which is highly transparent to the pump light and output laser.

In a class of this embodiment, the jet-flow impact cooling system comprises a refrigerator, water pump, water tank, cooling chamber, intake pipe, and backwater pipe. The cooling chamber is disposed within the parabolic reflector where the thin-disk laser crystal is. After being cooled by the refrigerator and compressed by the water pump, the low-temperature cooling liquid enters the cooling chamber through a nozzle installed at the end of the intake pipe, absorbs the waste heat produced by the thin-disk laser crystal and returns to the water tank through the backwater pipe and corresponding pipes around the cooling chamber.

In a class of this embodiment, one or more nozzles are designed at the end of the intake pipe within the jet-flow impact cooling system. The impact surface is flat, curved, or conical.

In a class of this embodiment, the optical element of diffuse reflection can be purchased from the market.

In a class of this embodiment, the jet-flow impact cooling system comprises a refrigerator, water pump, water tank, cooling chamber, intake pipe, and backwater pipe. After being cooled by the refrigerator and compressed by the water pump, the low-temperature cooling liquid enters the cooling chamber inside the first or second parabolic reflector through the nozzle installed at the end of intake pipe, absorbs the waste heat produced by the thin-disk laser crystal and returns to the water tank through the backwater pipe and corresponding pipes around the cooling chamber. One or more nozzles are designed at the end of the intake pipe of the jet-flow impact cooling system.

Advantages of the invention are summarized below:
1) The pumping method of the semiconductor laser stack group has high efficiency and long service life. The device involved can be conveniently maintained and repaired.
2) The multi-pumping focus cavity which comprises two parabolic reflectors, thin-disk laser crystal, corrective reflector or optical element of diffuse reflection can reduce the complexity of pump light shaper and collimator. There is no need for circularizing the obvious difference in beam parameter product on the fast or slow axis of the semiconductor laser stack group, thereby achieving high-efficiency multi-pumping, reasonable pump light spot area, and even distribution of power density.
3) The thin-disk laser crystal can be directly welded, pasted, or cramped to one of the parabolic reflectors. The jet-flow impact cooling method is adopted. The cooling efficiency is high, the structure is simple and requirements to cooling liquid, water pump, and cooling devices are low. Meanwhile, the temperature of the thin-disk laser crystal is relatively low and radial temperature gradient within the gain area is small, which is favorable for the application of such new gain materials as $Yb^{3+}$ and continuous laser output with high power, high beam quality, and high efficiency.
4) The laser can flexibly adopt different implementation modes as necessary to realize the injection of multiple pump lights, improve maximum pump power, gain the output laser which is parallel with middle axis, facilitate the application of output beam, construct V-shape or other forms of laser resonant cavity, obtain the output of large-mode volume or ground mode, concatenate several thin-disk laser crystals of gains and harvest higher output power.
5) The device is small in size, simple in mechanical structure and adjustment, and light in weight. It is very convenient for industrial application.

DETAILED DESCRIPTION OF THE EMBODIMENTS

Figure 1:
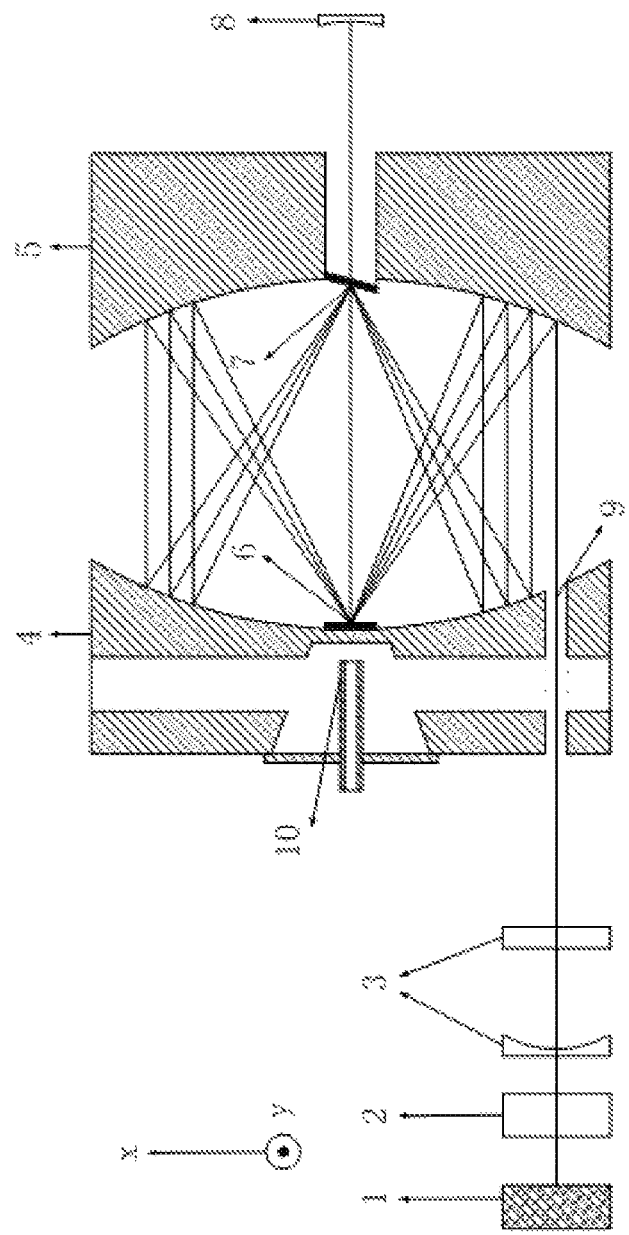
FIG. 1 is a schematic diagram of a laser in accordance with a first embodiment of the invention.

To further illustrate the invention, experiments detailing a laser are described below. It should be noted that the following examples are intended to describe and not to limit the invention.

The invention adopts one or more semiconductor laser stack groups as a source of pump. Two parabolic reflectors, a thin-disk laser crystal, a corrective reflector or optical element of diffuse reflection are formed into a multi-pumping focus cavity. The collimating and focusing is performed by the two parabolic reflectors placed on conjugated axis so as to realize efficient multi-pumping pump. In the first implementation example (referred to as Example 1), some drifts exist between a bar entrance and a rapid axis of the semiconductor laser along the center of the first parabolic reflector. After being collimated, the pump light enters the focus cavity through the bar entrance. The corrective reflector with inclined position is selective in wavelength. The thin-disk crystal is installed vertically to the rotation axis of the parabolic reflector so that the pump light beam can gradually translate in the space after entering the focus cavity to realize multi-pumping, improve the light-light transfer efficiency of laser and enable the output laser to go along the rotation direction of the parabolic reflector. In the second implementation example (referred to as Example 2), the bar entrance is distributed evenly on both sides of the center of the first parabolic reflector. Two beams of pump light enter the focus cavity through the bar entrance after being composited and collimated. Within the focus cavity, the corrective reflector is placed in an inclined position and the thin-disk crystal is installed to be vertical or inclined to the rotation axis of the parabolic reflector so that two beams of the pump light can gradually translate in different special areas. In this way, it is possible to realize multi-pumping, inject higher pump power, improve the max output power of laser, reduce the complexity of beam compositor, flexibly design the constitution of the resonant cavity or achieve the concatenation of several thin-disk crystals, enhance the max output power, and gain better beam quality. In the third implementation example (referred to as Example 3), the bar entrance is evenly distributed on both sides of the first parabolic reflector along the slow axis of the semiconductor laser. Two beams of the pump light enter the focus cavity through the bar entrance after being composited and collimated. Within the focus cavity, the thin-disk crystal is placed in an inclined position and the optical element of diffuse reflection is laid either vertically or inclined so that two beams of the pump light can be distributed on the whole parabolic reflector through diffusion. Upon achieving multi-pumping, it is also possible to inject higher pump power, improve the laser's max output power, and reduce the complexity of beam compositor. All of above-mentioned examples adopt a jet-flow impact to cool the laser crystal.

The invention is described hereinbelow with reference to the accompanying drawings.

As shown in FIG. 1, a laser suggested by Example 1 comprises a semiconductor laser stack group 1, beam compositor 2, pump light collimator 3, first parabolic reflector 4, second parabolic reflector, thin-disk laser crystal 6, corrective reflector 7, output mirror 8, and jet-flow impact cooling system 10. Among those components, the first parabolic reflector 4 and second parabolic reflector are placed on the same axis. The pump light transmitted by the semiconductor laser stack group 1 enters the multi-pumping focus cavity formed by the first parabolic reflector 4, second parabolic reflector 5, thin-disk laser crystal 6 and corrective reflector 7 after being composited by the beam compositor 2 and collimated by the pump light collimator 3 so as to achieve multiple, efficient and even pump; and the thin-disk laser crystal 6 and the output mirror form a resonance cavity to produce an output laser.

The semiconductor laser stack group serves as the pump light source for the laser. Such kind of beam has different divergence angles and light spot sizes on a rapid axis (direction x) and a slow axis (direction y). The optical parameter product BPP on the direction of the slow axis is far larger than that of on the direction of the rapid axis. More concretely, the output light beam's cross-section in the semiconductor laser stack group 1 is rectangular with size of 20 mm on the rapid axis direction and 10 mm on the slow axis direction. Meanwhile, under such circumstance, the divergence angle on the rapid axis direction is below 1 mrad while the divergence angle on the slow axis direction is generally above 50 mrad. On the whole, the beam quality of the semiconductor laser stack group 1 is worse.

The pump light collimator 3 collimates the beam with cross-section being rectangular which is composited by the beam compositor 2 and transmitted by the semiconductor laser stack group 1. Bar light spot will be gained on the bar bump light entrance 9 below the first parabolic reflector 4. The size of the light spot on the direction x is far smaller than that on the direction y. The divergence angles of the collimated pump light beam on the directions x and y are relatively small and equal to each other. Here the beam collimated by the pump light collimator 3 can be transmitted by either single semiconductor laser stack group or several semiconductor laser stack groups after being composited by the beam compositor.

The first parabolic reflector 4, second parabolic reflector 5, thin-disk laser crystal 6 and corrective reflector 7 form the multi-pumping focus cavity. FIG. 2 illustrates a relationship of all the components within the focus cavity. In the figure, the first paraboloid 11 and second paraboloid 12 are respectively the reflecting surfaces of first parabolic reflector 4 and second parabolic reflector 5. The first paraboloid 11 and second paraboloid 12 share same parabolic function and axis and their focal lengths are all P. The distance between their vertexes is P/2. The focus of the first paraboloid 11 coincides with the vertex of the second paraboloid 12 while the focus of the second paraboloid 12 coincides with the vertex of the first paraboloid 11, thus the two parabolic reflectors are conjugated.

The thin-disk laser crystal 6 is a disk-shape crystal with thickness of 0.1 mm-1 mm and diameter of 4 mm-20 mm. It is an active medium of laser. The side of this crystal, which is away from the second paraboloid 12, is galvanized with a coating which is highly reflective to the pump light and output laser and which forms laser resonant cavity together with the output mirror 8. The other side of the crystal is galvanized with a coating which is highly transparency to the pump light and the output laser to reduce the reflection loss of the pump light and the output laser. The thin-disk laser crystal 6 is welded, pasted, or cramped to the vertex area of the first paraboloid 11, namely the focus area of the second paraboloid 12. During the installation, the focus of crystal may be properly adjusted so that its front and back surfaces can be vertical to the rotation axis of paraboloids 11 and 12.

The diameter of the corrective reflector 7 is approx. 20 mm and its reflecting surface is flat. It is installed on the vertex area of the second paraboloid 12, namely the focus area of the first paraboloid 11. Its normal of the reflecting surface rotates around the axis y and the angle α between the corrective reflector and the first paraboloid 11 or second paraboloid 12 is 1-5 degrees. The galvanized coating of the corrective reflector is selective in the wavelength and it is a high-reflection coating to the pump light but a high-transparency coating to the output laser. In other words, the corrective reflector is an insertion element within the laser resonant cavity. Meanwhile, together with the thin-disk laser crystal 6 in the focus area of the second paraboloid 12 and the conjugated first and second paraboloids 11 and 12, the corrective reflector enables the collimated pump light beam entering through the bar entrance to converge on the thin-disk laser crystal 6 for several times so as to make it possible to conduct multi-pumping and improve the power density, absorption rate and evenness of pump light. The concrete example about the implementation of multi-pumping is explained below in details.

Figure 2A:
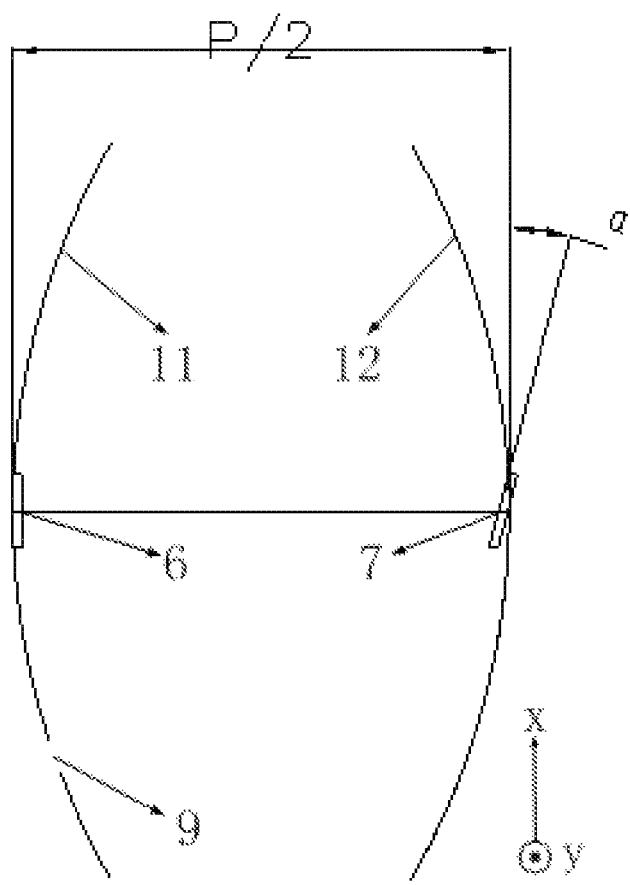
FIG. 2a is a front view of a multi-pumping focus cavity as defined in FIG. 1.
Figure 2B:
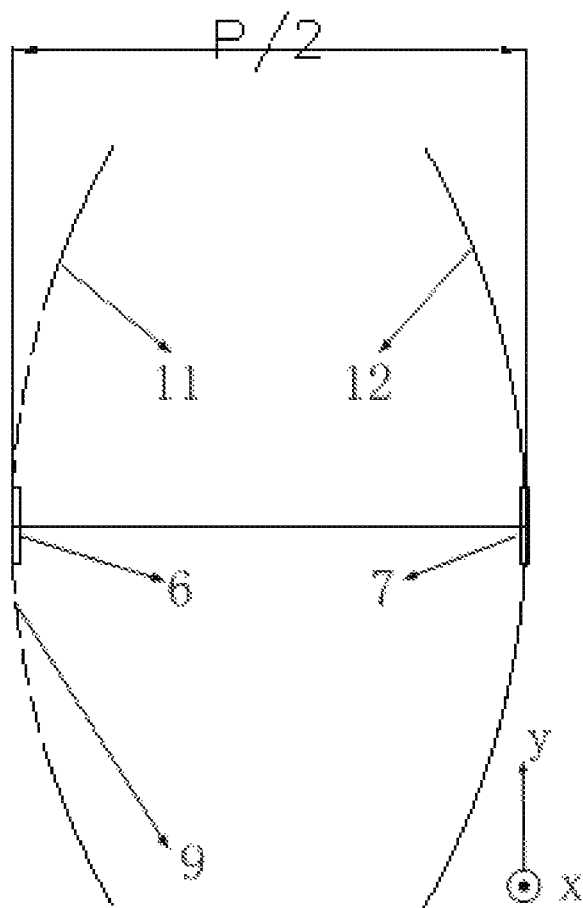
FIG. 2b is a top view of a multi-pumping focus cavity as defined in FIG. 1.

As shown in FIGS. 2a-2b, the bar entrance 9 is long and narrow with its long and short sides being respectively parallel to axis x and y (size on direction x is far smaller than that on direction y). Its center is situated on the plane formed by the rotation axis of two paraboloids and axis x and some difference from the first parabolic reflector exists. The collimated pump light enters the multi-pumping focus cavity from here.

As shown in FIG. 1, the composited and collimated pump light strikes first the second parabolic reflector 5 through the bar entrance on the basis of the principle that the parabolic reflector can reflect and converge the collimated light beam parallel to the rotation axis to the focus. The pump light will be converged on the thin-disk laser crystal 6. The laser crystal absorbs some of the pump light while the residual part will be reflected by the high-transparency coating of laser crystal 6 to the second parabolic reflector 5 because the normal of the laser crystal's reflecting surface is the rotation axis of the paraboloid and the angles of incoming beam and emergent beam and rotation axis are the same with each other. The second parabolic reflector 5 reflects and collimates the divergence beam transmitted from the focus to the first parabolic reflector 4 by being parallel to the rotation axis. The first parabolic reflector 4 will converge the light beam again to the focus namely the corrective reflector 7. Since there is an included angle α between the normal on the reflecting surface of the corrective reflector 7 and rotation axis, the included angle between the emergent light and rotation axis will be changed to be 2α after the reflection of the corrective reflector 7. Due to the offsetting effect of the corrective reflector 7, the light beam from the corrective reflector will return to the first parabolic reflector 4 instead of the bar entrance 9. Then the light beam is reflected and collimated to the second parabolic reflector 5 by being parallel to rotation axis on the place which is of displacement to some degree from the bar bump light entrance 9. The light beam continues to be focused, collimated, and offset within the multi-pumping focus cavity to repeat above-mentioned transmission process. The corrective reflector 7 ceaselessly offsets the direction of emergent light beam and the light beam itself also displaces along the axis x on the parabolic reflector. During the transmission process, the light beam will be converged on and absorbed by the thin-disk laser crystal 6 for several times so as to realize multi-pumping and improve the application rate of the pump light. Meanwhile, the thin-disk laser crystal 6 and the corrective reflector 7 are installed out-of-focus. Each time the light spot converged on the thin-disk laser crystal 6 slightly offsets, deforms and twits. The overlay of several bump light spots can achieve even distribution of power density within the pump area.

In injecting a beam of pump, such kind of distribution of the bar entrance can enable the thin-disk laser crystal 6 to be placed vertically to the rotation axis of the two paraboloids and the area of the parabolic reflector to be fully used so as to gain more pumping times.

The output mirror 8 is an output coupling mirror. It can be a flat or curved one. Together with the high-reflection coating on one side of the thin-disk laser crystal 6, the output mirror forms the resonant cavity to amplify the resonance and output the laser.

The jet-flow impact cooling system 10 is responsible for cooling the active medium of laser so as to improve the transfer efficiency and working stability of output laser. This system is explained in details below.

Figure 3A:
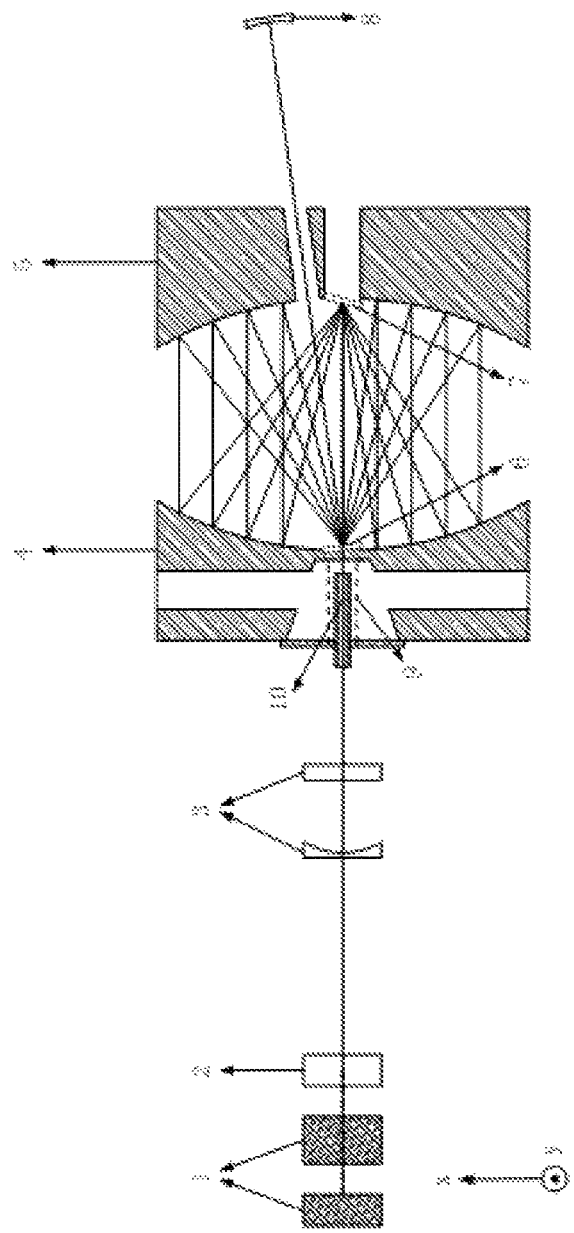
FIGS. 3a-3b are schematic diagrams of a laser of a second embodiment of the invention.
Figure 3B:
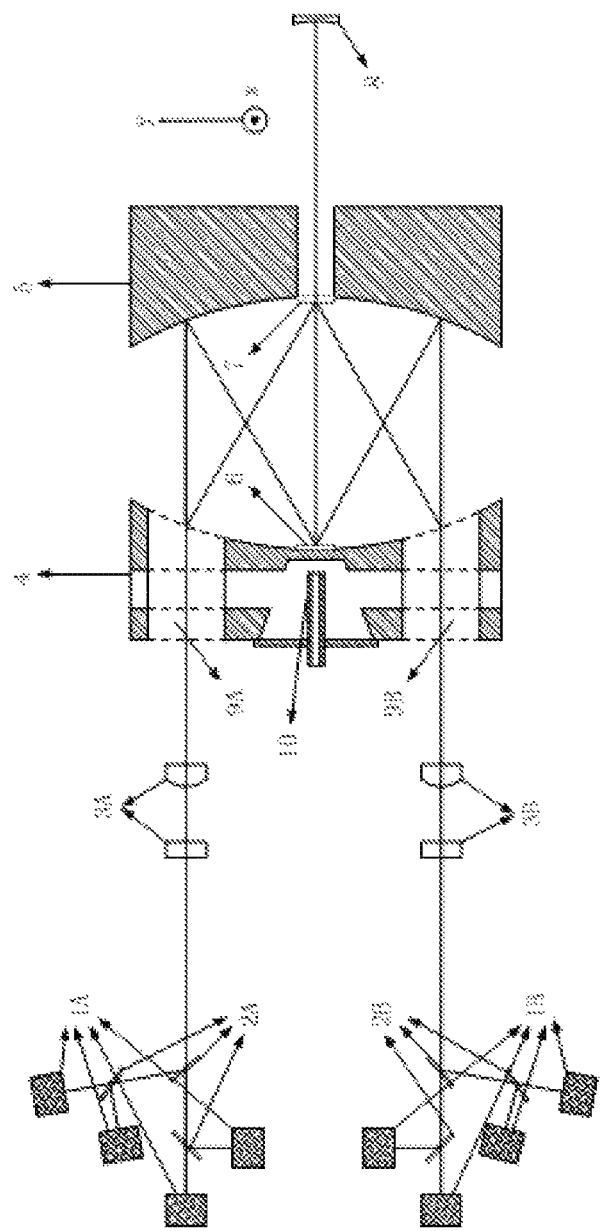

As shown in FIGS. 3a-3b, a laser suggested in a second implementation example comprises a semiconductor laser stack group 1, beam compositor 2, pump light collimator 3, first parabolic reflector 4, second parabolic reflector 5, thin-disk laser crystal 6, corrective reflector 7, output mirror 8, and jet-flow impact cooling system 10. Among those components, the thin-disk laser crystal 6 and output mirror 8 form a laser resonant cavity while the first parabolic reflector 4 and second parabolic reflector 5 are conjugated to for a multi-pumping focus cavity together with the thin-disk laser crystal 6 and corrective reflector 7 so as to achieve multiple, efficient and even pumping for thin-disk laser crystal.

The semiconductor laser stack group 1 is divided to be part A and part B which are marked as 1A and 1B in FIG. 3b. Corresponding beam compositor 2 and beam collimator 3 also have respectively two parts. The pump light transmitted by several semiconductor laser stack group 1A goes first through the beam compositor 2A and pump light collimator 3A to decrease and equalize the divergence angles on the rapid axis and the slow axis and then enters the multi-pumping focus cavity formed by the first parabolic reflector 4, second parabolic reflector 5, thin-disk laser crystal 6 and corrective reflector 7 through the bar entrance 9A. Similarly, the light beam transmitted by several semiconductor laser stack group 1B enters the multi-pumping focus cavity through the bar entrance 9B after being composited and collimated by the beam compositor 2B and the bump light collimator 3B.

Two bar entrances 9A and 9B on the reflecting mirror of first parabolic reflector are distributed evenly along two sides of the slow axis (direction y) of the semiconductor laser. The size on direction x is far smaller than that on direction y so that they can match the size of cross-sections of two collimated pump light.

Figure 4A:
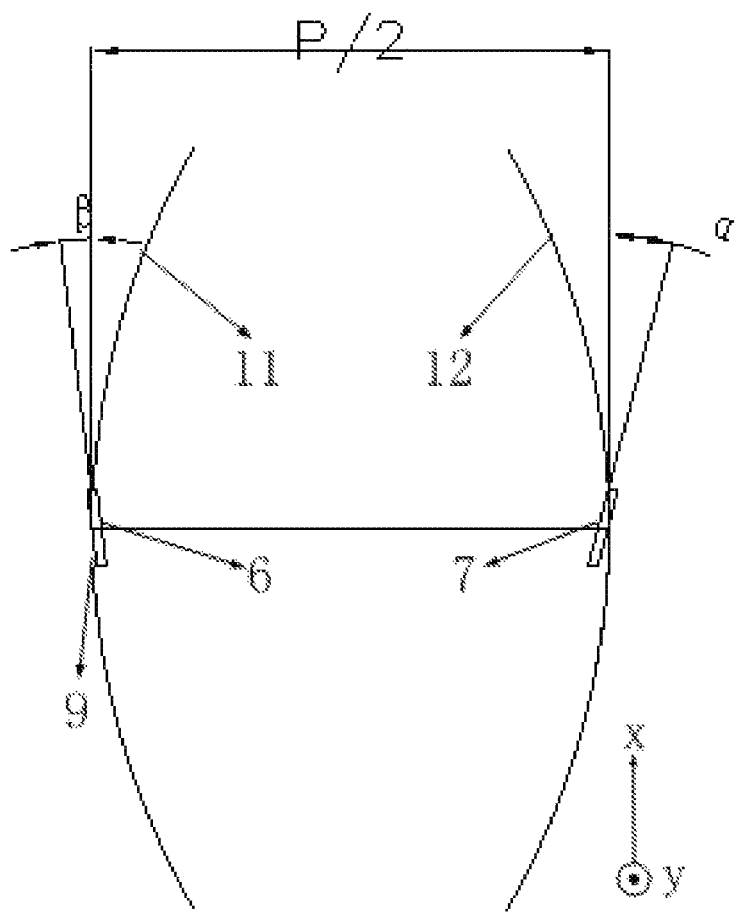
FIG. 4a is a front view of a multi-pumping focus cavity as defined in FIG. 3.
Figure 4B:
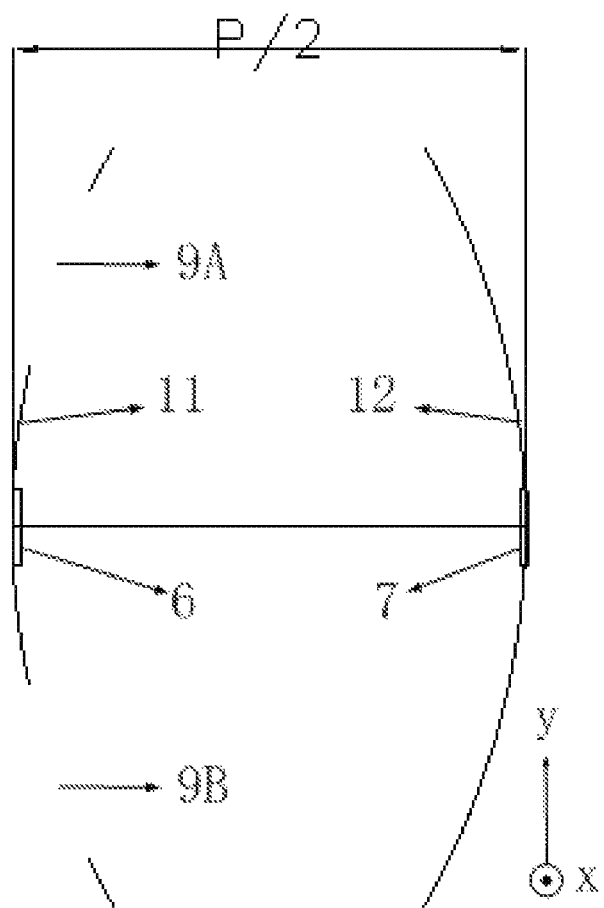
FIG. 4b is a top view of a multi-pumping focus cavity as defined in FIG. 3.

As shown in FIGS. 4a-4b, like Example 1, the reflecting surfaces of first parabolic reflector 4, second parabolic reflector 5 are respectively called first paraboloid 11 and second paraboloid 12. Those two paraboloids have same surface function and they are conjugated. The thin-disk laser crystal 6 and corrective reflector 7 are respectively placed within the focus area of the two paraboloids in an inclined position. The normal of reflecting surfaces on the thin-disk laser crystal 6 and the corrective reflector 7 forms included angles β and α with axis x on the plane which is formed by axis x and the rotation axis of the two paraboloids. The imaging principle with two conjugated parabolic reflectors is utilized to offset and remedy the transmission direction of the pump light beam with inclined thin-disk laser crystal 6 and corrective reflector 7 and complete the process of multi-pumping within the multi-pumping focus cavity so as to effectively enhance the power density, absorption rate and evenness of pump light. The concrete example for achieving multi-pumping is explained in details below.

In the first implementation example, in order to properly offset and remedy the transmission direction of pump light beam, the inclined direction of the thin-disk laser crystal 6 is opposite to that of the corrective reflector 7 and the inclined degree is also different. Generally, the angle difference is 1-5 degrees. The inclined degree of the thin-disk laser crystal 6 is 3-8 degrees to separate the direction of laser resonance from that of pump light.

Figure 5A:
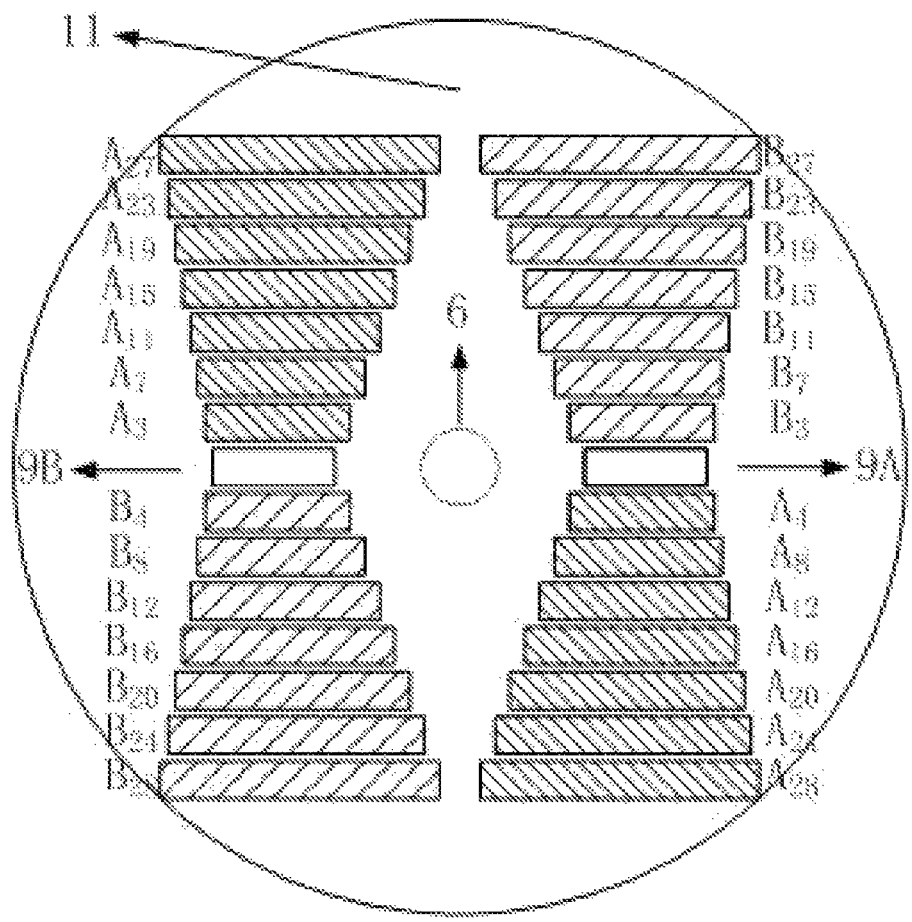
FIG. 5a is a general view of light spot distribution on a first parabolic reflector during multiple times of pumping according to a second embodiment of the invention.
Figure 5B:
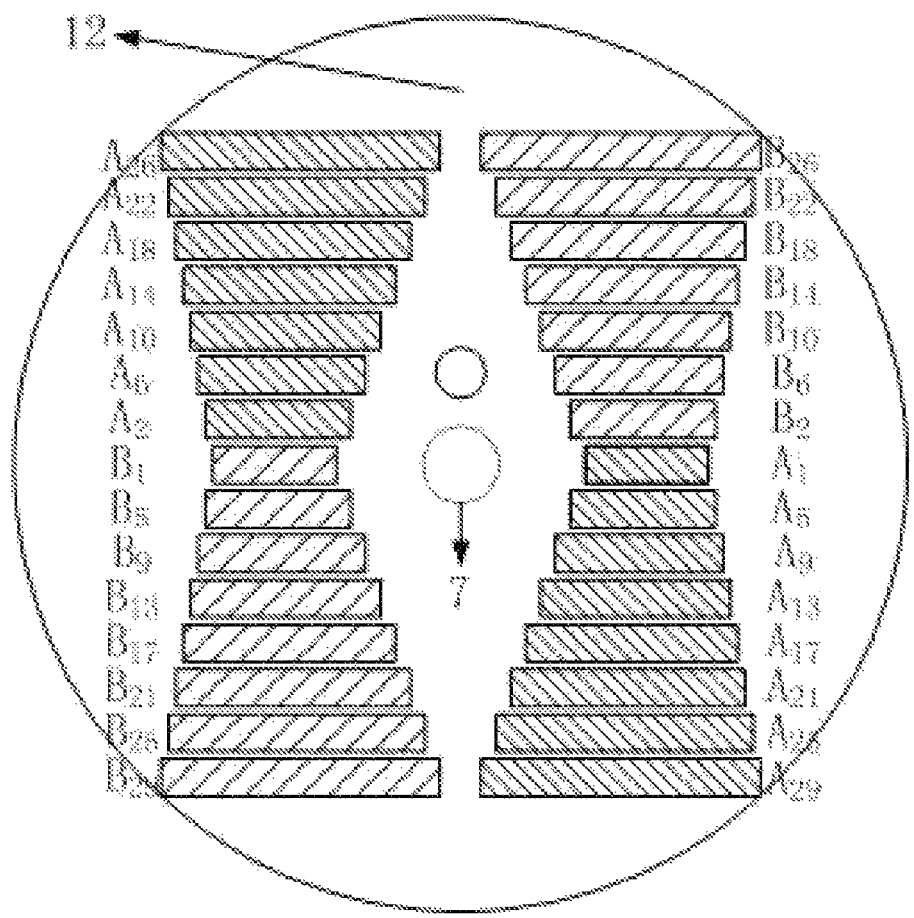
FIG. 5b is a general view of light spot distribution on second parabolic reflector during multiple times of pumping according to a second embodiment of the invention.

As shown in FIGS. 5a-5b, after being transmitted by the semiconductor laser stack group 1A, composited by the light beam compositor 2A and collimated by the pump light collimator 3A, the pump light beam enters the multi-pumping focus cavity through the bar entrance 9A to be reflected on the area A1 of second paraboloid 12 and focused on the thin-disk crystal 6. The inclined thin disk reflects the part which is not absorbed to area A2 of the second paraboloid 12. The light beam is again reflected to be collimated beam parallel to the optical axis to the area A3 on the first paraboloid 11. The first paraboloid 11 reflects the light beam to the corrective reflector 7. Since the inclined direction of the corrective reflector 7 is opposite to that of the thin-disk crystal 6 and the inclined angles are also different, the aforesaid light beam will enter the area A4 of first paraboloid 11 instead of the bar entrance 9A after being reflected by the corrective reflector 7. After being reflected by the area A4 of the first paraboloid, the light beam directs to the second paraboloid 12 by being parallel to the rotation axis of the paraboloid similar to the collimated pump light from 9A. The light beam continuous to be focused, collimated, offset, and corrected within the multi-pumping focus cavity as well as converge on the thin-disk laser crystal 6 for several times in later transmission process until it is totally absorbed or the light spot is removed from the mirror diameter or the focus cavity.

As shown in FIGS. 5a-5b, the pump light transmitted by the semiconductor laser stack group 1A has its light spots on the upper left and lower right of two reflecting surfaces in focus cavity during the multi-pumping process. Likewise, the pump light transmitted by the other group of the semiconductor laser stack group 1B enters the multi-pumping focus cavity through the bar entrance 9B, completes the multi-pumping process which is similar to that of light beam transmitted by the semiconductor laser stack group 1A, and the light spots are distributed evenly on the upper right and lower left of two paraboloids. The transmission direction and special position of pump light beams transmitted by the semiconductor laser stack groups 1A and 1B are symmetrical so that such a pumping structure can accept pump light beams from two entrances at the same time. This is more efficient for making use of reflecting surfaces on paraboloids and improving the max pump power or simplifying the beam compositor 2.

Because the thin-disk laser crystal 6 is laid in an inclined position, the laser resonant cavity formed by the thin-disk laser crystal 6 and the output mirror 8 avoids the corrective reflector 7 and achieves the separation of laser resonant direction from the direction of pump light.

The vertically placed thin-disk laser crystal 6 is more favorable for using the jet-flow impact cooling system 10 to conduct an even and efficient cooling, facilitate the adjustment and setting of laser resonant cavity and convenient the installation and welding of laser crystal. Most importantly, during the multi-pumping process in conjugated parabolic structure, the inclined thin-disk laser crystal 6 can cause the shape of pump light spot to be twisted and deformed. This is unfavorable for gaining the much-expected square pump light spot. In this example, the objective can be achieved by following the layout listed below.

Figure 6A:
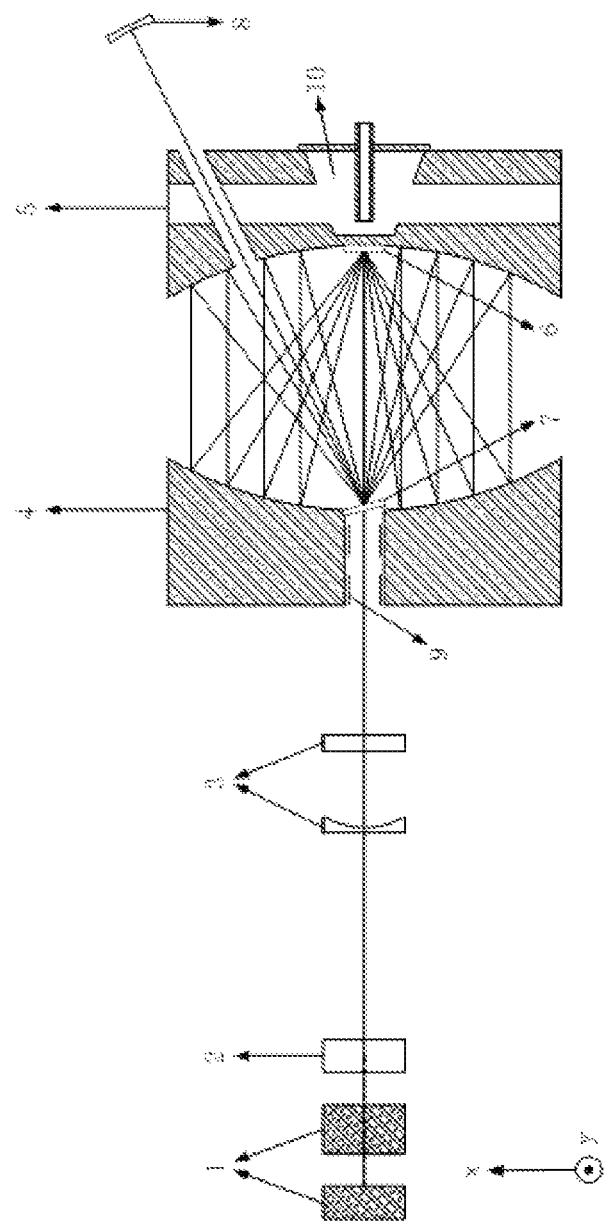
FIGS. 6a-6c are schematic diagrams of layouts of two parabolic reflectors in accordance with one embodiment of the invention.

The implementation for the thin-disk laser crystal to be vertical to the rotation axis of the first and second paraboloids 11 and 12 is shown in FIG. 6a. Like the implementation method shown in FIG. 3a, the divergence angle of the pump light transmitted by one or two semiconductor laser stack group 1 along the rapid ad slow axis is decreased and equalized after the pump light is composited by the beam compositor 2 and collimated by the pump light collimator 3. Then the pump light enters the multi-pumping focus cavity through the bar entrance 9 on the first parabolic reflector 4. The difference lies in that the thin-disk laser crystal 6 is installed on the vertex area of the second parabolic reflector 5 by being vertical to the rotation axis of two paraboloids while the corrective reflector 7 is installed in the vertex area of the first parabolic reflector 4 with inclined direction being the same as that in FIG. 3a and the inclined angle is relatively small. The pump light beam completes the multi-pumping process described in FIGS. 3a, 5a and 5b within the focus cavity. The jet-flow impact cooling system 10 is fixed on the second parabolic reflector 5. Here the corrective reflector is highly reflective towards the pump light and output laser, so the laser resonant cavity formed by the thin-disk laser crystal 6, corrective reflector 7 and output mirror 8 can achieve the output of laser.

Figure 6B:
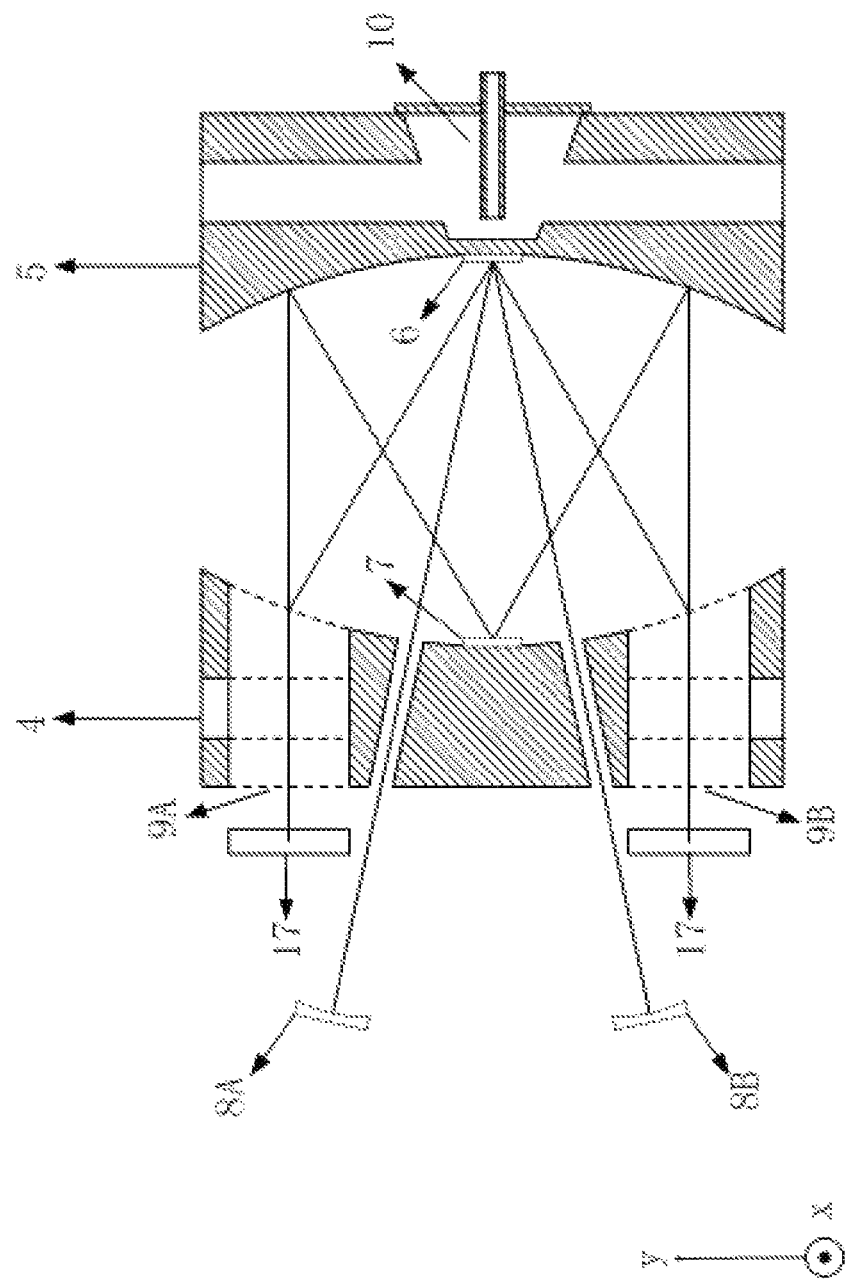

Another kind of layout is shown in FIG. 6b. In this layout, the installation position and angle of the thin-disk laser crystal 6 and the corrective reflector 7 are the same with that in FIG. 6a. The pump light transmitted by two semiconductor laser stack groups 1 goes towards the break reflector 17 along direction x after being composited by beam compositor 2 and collimated by the pump light collimator 3. The break reflector 17 is a bar plane mirror which rotates the axis y by 45°. In other words, the normal of reflector's surface is on the plane xz and the included angle between the reflector and axis x is 45°. Because the pump light beam entering the break reflector 17 is quasi-parallel light beam which has been collimated, it remains to be the quasi-parallel light beam with the same divergence angles on rapid and slow angles after the reflection of break reflector 17. After that, the light beam is injected into the pump light focus cavity through the bar entrance 9 for further focusing, collimation, deflection and correction to complete the multi-pass pumping of thin-disk laser crystal 6. In FIGS. 5a and 5b, it is shown that during the transmission, the pump light beam goes through a thermal distortion each time when it passes the thin-disk laser crystal 6, the light spot on the paraboloid gradually enlarges. Since the thin-disk laser crystal 6 is vertically installed, which means its normal surface is on the plane yz, it is easier for the thin-disk laser crystal 6, output mirror 8A and total-reflecting mirror to form a resonant cavity. The output mirrors 8A and 8B can be either a flat mirror or a curved mirror. Such a resonant cavity can be designed with flexibility and the opening angles of two arms of such V-shape resonance cavity can be smaller as shown in FIG. 6b. In other words, the vibrating laser beam passes the first parabolic reflector 4 between the corrective reflector 7 and bar entrance 9. The bar entrance can also be installed next to the center of the first parabolic reflector 4 and the opening angles of resonant cavity's arms are enlarged so that the light beam can pass the first parabolic reflector 4 from the external side of bar entrance 9. Moreover, the structure of resonant cavity is not limited to the V-shape resonant cavity, it can also be expanded to the Z-shape, circular shape or other shapes so as to flexibly adjust such parameters as systematic module size and output characteristics.

Figure 6C:
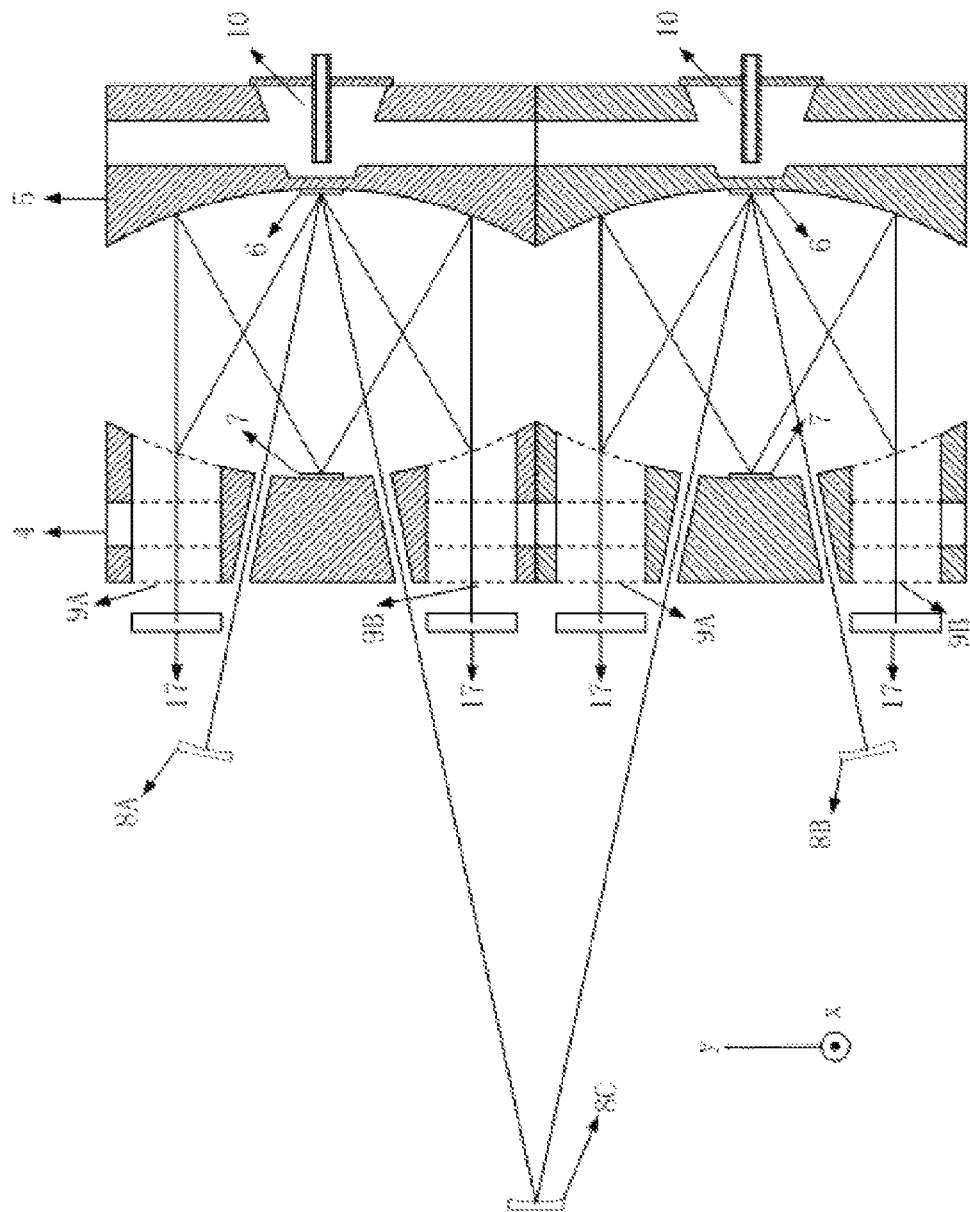

FIG. 6c illustrates the layout of concatenation of gain medium adopted in this example. Two groups of the double parabolic multi-pumping structure as shown in FIG. 6b are disposed in mirror image. The break total-reflection mirror 8C is placed on the symmetrical axis. The output mirror 8A, first thin-disk laser crystal 6, break total-reflection mirror 8C, second thin-disk laser crystal 6, and total-reflection mirror 8B form a laser resonant cavity. The output mirror 8A, total-reflection mirror 8B and break total-reflection mirror 8C can be either flat mirror or curved mirror. Such kind of concatenation is not limited to the connection of two thin-disk laser crystals 6. It can complete the connection of several pieces of laser crystals.

Figure 7:
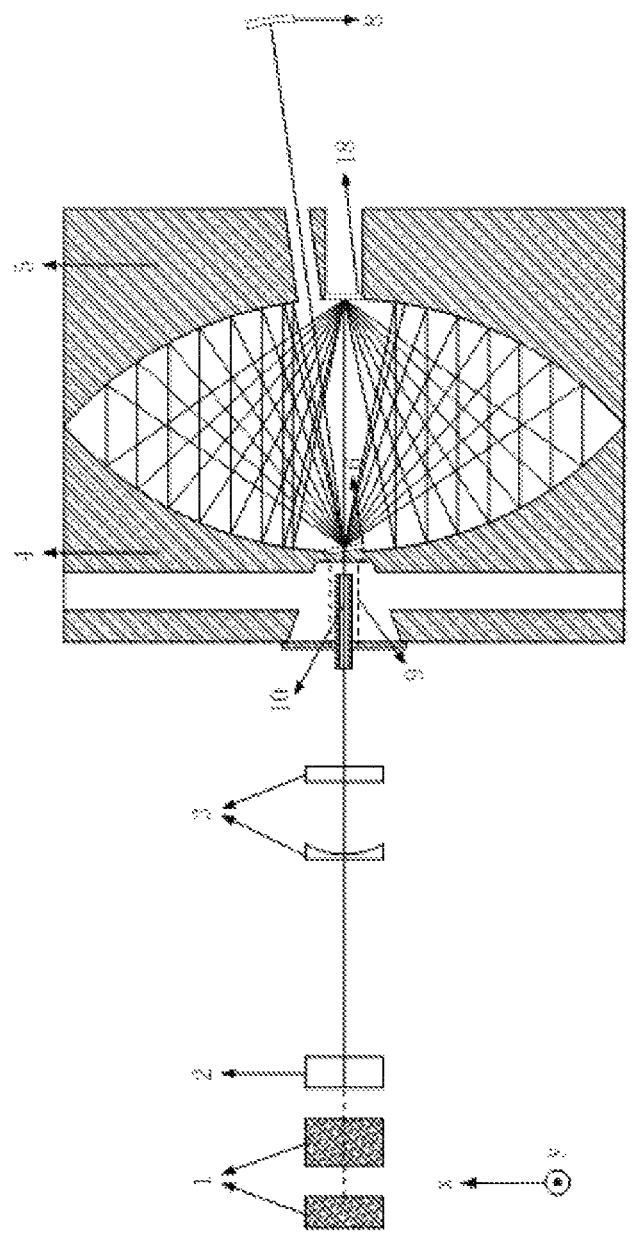
FIG. 7 is a schematic diagram of a laser of a third embodiment of the invention.

As shown in FIG. 7, a laser provided in a third implementation example (refer to as Example 3) comprises a semiconductor laser stack group 1, light beam compositor 2, pump light collimator 3, first parabolic reflector 4, second parabolic reflector 5, thin-disk laser crystal 6, optical element of diffuse reflection 18, output mirror 8 and jet-flow impact cooling system 10. Among those components, the thin-disk laser crystal 6 and output mirror 8 form a laser resonant cavity while the first and second parabolic reflectors 4 and 5 are conjugated and those two reflectors form the multi-pumping focus cavity together with the thin-disk laser crystal 6 and optical element of diffuse reflection 18 to achieve multiple, efficient and even pumping for the thin-disk laser crystal 6.

The divergence angles of pump light transmitted by one or two semiconductor laser stack groups 1 on the rapid and the slow axis are decreased and equalized after the pump light is composited by the light beam compositor 2 and collimated by the pump light beam collimator 3. After that, the pump light enters the multi-pumping focus cavity which is formed by the first parabolic reflector 4, second parabolic reflector 5, thin-disk laser crystal 6 and optical element of diffuse reflection through the bar entrance 9. The bar entrance 9 on the first parabolic reflector is evenly distributed on two sides of its center along the semiconductor laser's slow axis (direction y). The size on direction x is far smaller than that on direction y so that they can match the cross-section size of two beams of collimated pump light.

Similar to Examples 1 and 2, the reflection surfaces of the first and second parabolic reflectors 4 and 5 are the first and second paraboloid 11 and 12 and the two paraboloids are conjugated. The thin-disk laser crystal 6 and optical element of diffuse reflection 18 are respectively placed within the focus areas of the two paraboloids in an inclined position. The normal direction on reflecting surface of the thin-disk laser crystal 6 is on the plane formed by axis x and the rotation axis of two paraboloids and the included angle β between it with axis x is 3-8 degrees. The imaging principle with conjugated paraboloids' reflecting surface is used here. The inclined thin-disk laser crystal 6 deflects the transmission direction of pump light and the optical element of diffuse reflection 18 acts on the input light beam so as to complete the multi-pumping process within the multi-pumping focus cavity. This can effectively improve the power density, absorption rate and evenness of the pump light. The concrete example for achieving multi-pumping is explained in details below.

In concrete practices, the influence of the optical element of diffuse reflection 18 on the input light beams can change the position of the input light beam on the first paraboloid 4. In order to separate the direction of laser resonance from the direction of pump light and form the resonant cavity, the thin-disk laser crystal 6 has relatively small inclined angle which is generally 3-8 degrees.

As shown in FIG. 7, the pump light beam is transmitted by the semiconductor laser stack group 1. It enters the multi-pumping focus cavity through the bar entrance 9 after being composited by the light beam compositor 2 and the pump light collimator 3. The light beam is first focused on the thin-disk crystal 6 by the second paraboloid 12. Then the inclined thin disk reflects the part which has been absorbed to the second paraboloid 12 and then reflects it to be quasi-parallel (being parallel to the optical axis) light beam to the first paraboloid 11. Because the thin-disk is inclined to some degree, the position of light spot on above-mentioned two paraboloids is deflected a little on direction x when compared with the light entrance, which means the light beam will not evade from the multi-pumping focus cavity through symmetrical light entrances. After that, the first paraboloid 11 focuses the light beam on the optical element of diffuse reflection 18 which will diffuse the input light beam. Then the light beam will not have a direction for it is diffused to the first paraboloid 11. Only a small portion of light beam evades from the multi-pumping focus cavity through the bar entrance 9 of the first paraboloid 11 while the major part is reflected by the first paraboloid to be collimated light beam parallel to the optical axis to the second paraboloid 12 and the thin-disk crystal 6 for re-focusing. The unabsorbed part is reflected by the high-reflection coating of the thin-disk crystal 6 to the second parabolic reflector. Repetitive process are conducted so that the light beam is focused, collimated and diffused within the multi-pumping focus cavity and then converged on the thin-disk laser crystal 6 until it is completely absorbed. Such a pumping method can make use if the characteristics of the diffusion, greatly improve the times of effective pumping and enhance the application rate of pump light. Correspondingly, in concrete implementation, it is possible to use thinner, lower density thin-disk laser crystal 6 in order to effectively reduce the thermal lensing effect and gain higher light-light transferee rate and better output laser beam quality. Moreover, compared with corrective reflector, the optical element of diffuse reflection 18 demands lower conditions in installation and have more evenly distributed light on paraboloid, lower power density and lower possibility to cause destruction or distortion to the parabolic reflector.

Under such an implementation method, the structure of resonant cavity (which is formed by the output mirror 8) is shown in FIG. 7. The opening can also be set on the second parabolic reflector to form V-shape or other forms of cavity. Such kind of implementation method can adopt the above-mentioned set of structure in which the laser comprises one piece of laser crystal or the resonance cavity shown in FIG. 6c which adopts the concatenation of several pieces of the thin-disk crystal.

Examples 1-3 all adopt the jet-flow impact cooling system 10 to cool the active media for laser. The jet-flow impact cooling system mainly comprises following parts: refrigerator, water pump, water tank, cooling chamber, and corresponding pipeline. As shown in FIGS. 8a-8d, the low-temperature cooling liquid which has been cooled by the refrigerator and compressed by the water pump is sprayed by the nozzle 14 fixed at the end of the intake pipe 13 and enters the cooling chamber 15 within the first parabolic reflector 4 or second parabolic reflector 5. Under the effect of the nozzle 14, the cooling liquid strikes the surface which needs to be cooled with certain diffusion angle. The low-temperature cooling liquid absorbs the waste heat produced by the thin-disk laser crystal 6 and rapidly returns to the water tank of refrigerator through several backwater pipes 16 and corresponding pipes around the cooling chamber 15.

Figure 8A:
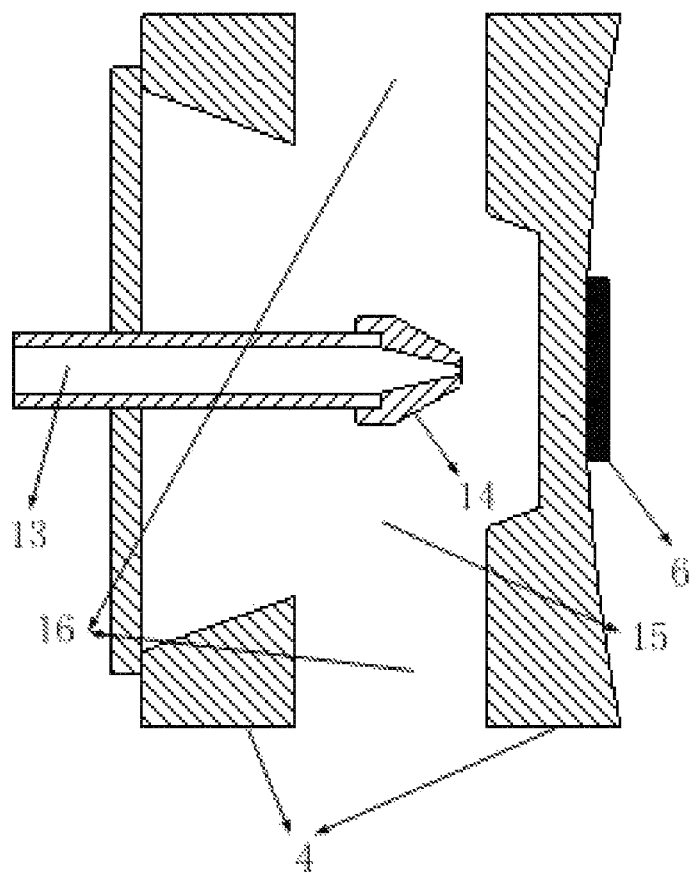
FIGS. 8a-8d are schematic diagram of a jet-flow impact cooling system in accordance with one embodiment of the invention.
Figure 8B:
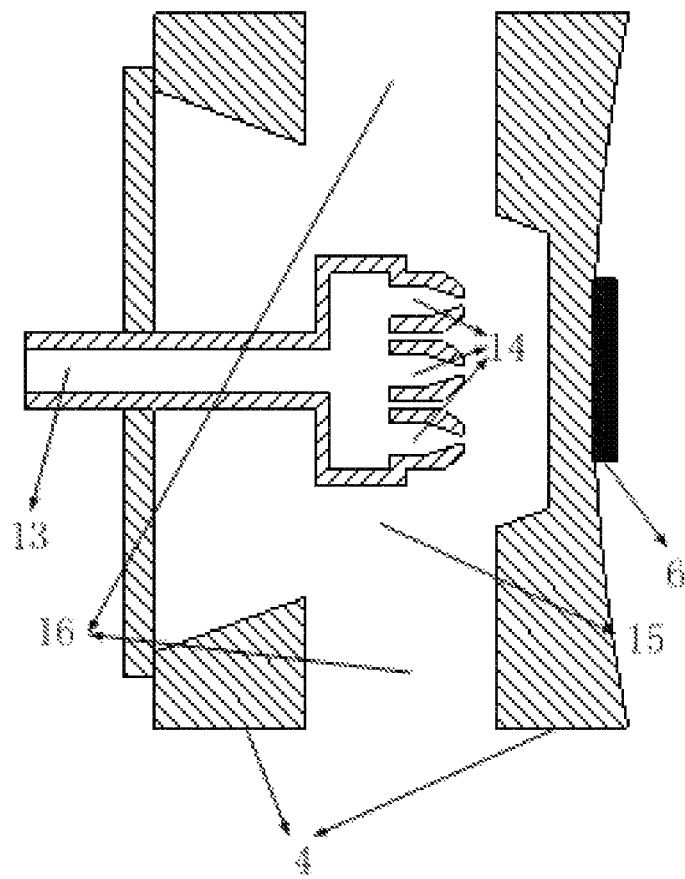
Figure 8C:
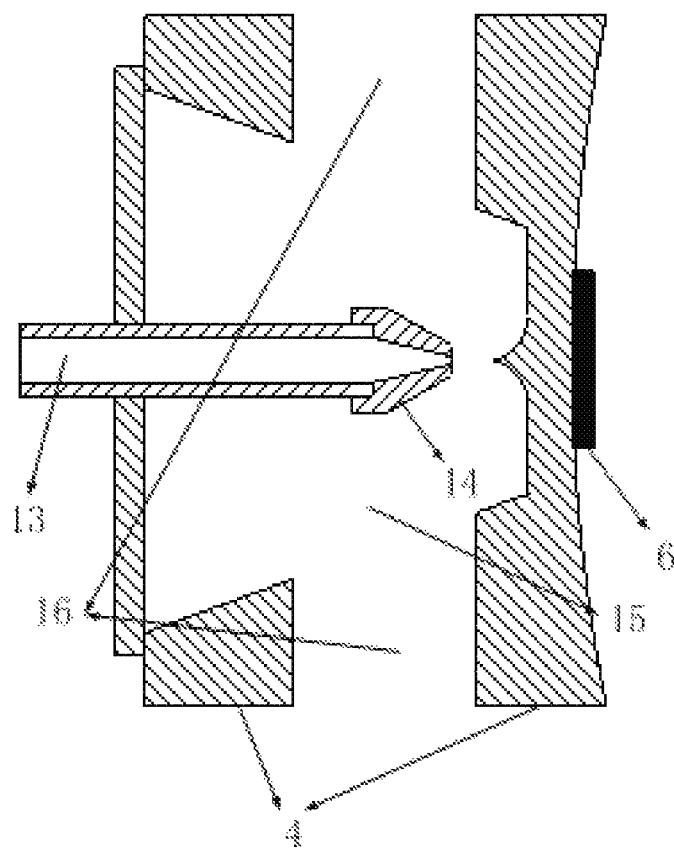
Figure 8D:
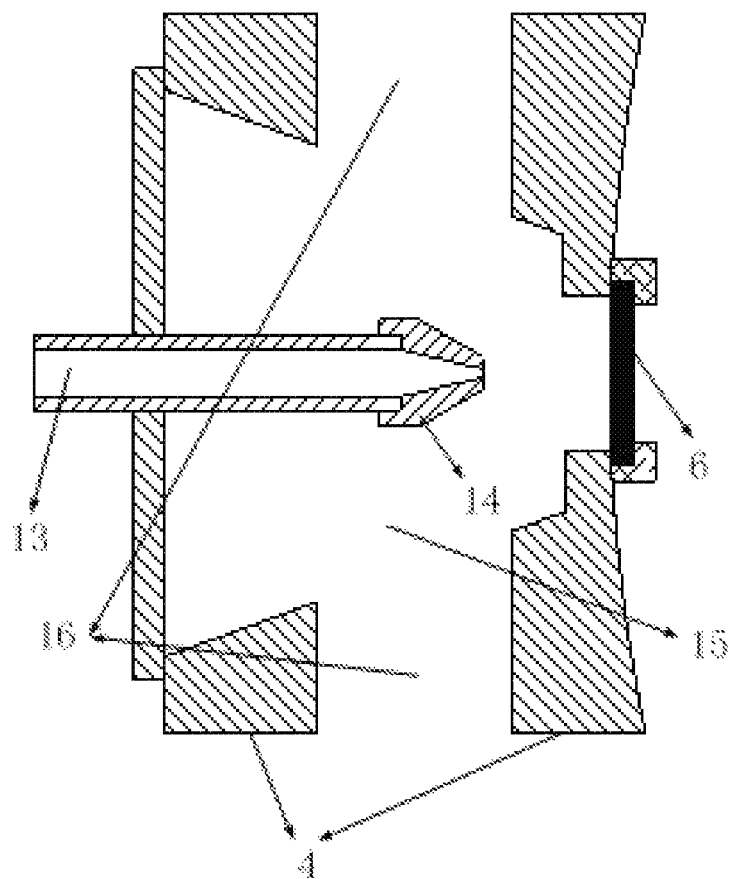

In concrete implementation, the system can be equipped with one (as shown in FIG. 8a) or more nozzles (as shown in FIG. 8b). The impacted surface can be either flat or curved so as to direct the flowing direction of cooling liquid and improve the cooling efficiency (as shown in FIG. 8c). Moreover, the thin-disk laser crystal 6 can be welded, pasted, or cramped to the vertex area of the first parabolic reflector 4 so that the cooling liquid can impact corresponding areas within the reflector. The thin-disk laser crystal 6 can also be cramped to the opening in the vertex area of the first parabolic reflector 4 so that the jet flow can directly impacts the back part of the thin-disk crystal (as shown in FIG. 8d). Under such kind of cooling method, the thin-disk laser crystal 6 can be formed only by the active medium and corresponding coating or by the composite thin-disk crystal which is formed by active medium layer, mechanical enhancement layer and heat conduction layer with corresponding galvanized coating. Meanwhile, the shape of the cooling chamber 15, intake pipe 13, and backwater pipe 16 can be flexibly designed and arranged.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A laser, comprising:
a) a semiconductor laser stack group;
b) a beam compositor;
c) a pump beam collimator;
d) a thin-disk laser crystal;
e) a first and second parabolic reflectors with the same facial contour function;
f) a corrective reflector;
g) an output mirror; and
h) a jet-flow impact cooling system for cooling the thin-disk laser crystal;

wherein:
the thin-disk laser crystal and the output mirror form a laser resonant cavity;
the first and second parabolic reflectors are placed with the same conjugated axis and one of the reflectors has a vertex on a focus of the other;
the thin-disk laser crystal is welded, pasted, or cramped to the vertex of the first parabolic reflector;
the thin-disk laser crystal is vertical to an optical axis of the first parabolic reflector;
the corrective reflector is fixed on the vertex of the second parabolic reflector;
an angle formed between the corrective reflector and an optical axis of the second parabolic reflector is 1-5 degrees;
a bar entrance of pump light is fixed on the first parabolic reflector, and a geometrical center of the bar entrance drifts along a fast axis relative to the thin-disk laser crystal;
the pump light produced by the semiconductor laser stack group is composited by the beam compositor, collimated by the pump light collimator, and enters a multi-pumping focus cavity through the bar entrance on the first parabolic reflector;
the multi-pumping focus cavity is formed by the first parabolic reflector, second parabolic reflector, thin-disk laser crystal, and corrective reflector; and
within the multi-pumping focus cavity, the pump light is focused, collimated, and deflected to converge on the thin-disk laser crystal, and the laser resonant cavity produces and outputs a laser.

2. The laser of claim 1, wherein the corrective reflector comprises a coating which is wavelength-selective, and reflective for the pump light and transparent for the output laser.

3. The laser of claim 1, wherein one side of the thin-disk laser crystal which is away from the second parabolic reflector is galvanized with a coating which is reflective to the pump light and output laser while the other side is galvanized with a coating which is transparent to the pump light and output laser.

4. The laser of claim 1, wherein
the jet-flow impact cooling system comprises a refrigerator, water pump, water tank, cooling chamber, intake pipe, and backwater pipe;
the cooling chamber is disposed within the parabolic reflector where the thin-disk laser crystal is; and
after being cooled by the refrigerator and compressed by the water pump, a low-temperature cooling liquid enters the cooling chamber through a nozzle installed at the end of the intake pipe, absorbs waste heat produced by the thin-disk laser crystal and returns to the water tank through the backwater pipe and corresponding pipes around the cooling chamber.

5. The laser of claim 4, wherein one or more nozzles are designed at the end of the intake pipe within the jet-flow impact cooling system, and the impact surface is flat, curved, or conical.

* * * * *